US009619192B2

(12) United States Patent
Anei

(10) Patent No.: US 9,619,192 B2
(45) Date of Patent: Apr. 11, 2017

(54) PRINTING APPARATUS, POWER-OFF CONTROL METHOD, AND RECORDING MEDIUM

(71) Applicant: KONICA MINOLTA, INC., Chiyoda-ku, Tokyo (JP)

(72) Inventor: Shin Anei, Takarazuka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/091,516

(22) Filed: Apr. 5, 2016

(65) Prior Publication Data

US 2016/0328186 A1 Nov. 10, 2016

(30) Foreign Application Priority Data

May 7, 2015 (JP) ................................ 2015-094557

(51) Int. Cl.
*G06K 15/00* (2006.01)
*G06F 3/12* (2006.01)
*H04N 1/00* (2006.01)

(52) U.S. Cl.
CPC ............ *G06F 3/126* (2013.01); *G06F 3/1207* (2013.01); *G06F 3/1261* (2013.01); *G06F 3/1286* (2013.01); *G06F 3/1292* (2013.01); *H04N 1/00891* (2013.01); *H04N 2201/0094* (2013.01)

(58) Field of Classification Search
None
See application file for complete search history.

(56) References Cited

U.S. PATENT DOCUMENTS

2014/0126012 A1* 5/2014 Chung ............... G06K 15/1817
358/1.15
2015/0192889 A1* 7/2015 Osawa ............... G03G 15/5075
399/88

FOREIGN PATENT DOCUMENTS

JP 2007320051 A 12/2007
JP 2014094471 A 5/2014

* cited by examiner

*Primary Examiner* — Dov Popovici
(74) *Attorney, Agent, or Firm* — Holtz, Holtz & Volek PC

(57) ABSTRACT

A printing apparatus includes: a receiver that externally receives a power-off command; a job execution portion that executes a job; a burden information obtaining portion that obtains burden information upon receipt of the power-off command by the receiver, the burden information relating to a burden to be imposed on a system of the printing apparatus for executing one or more jobs in a queue stored on the printing apparatus; and a processor that performs either of the following operations depending on the burden information obtained by the burden information obtaining portion: turning off the printing apparatus after making the job execution portion execute at least one, or all of the one or more jobs in the queue; and turning off the printing apparatus without making the job execution portion execute any job in the queue.

11 Claims, 6 Drawing Sheets

PRINTING APPARATUS, POWER-OFF CONTROL METHOD, AND RECORDING MEDIUM

This application claims priority under 35 U.S.C. §119 to Japanese Patent Application No. 2015-094557 filed on May 7, 2015, the entire disclosure of which is incorporated herein by reference in its entirety.

BACKGROUND OF THE INVENTION

Field of the Invention

The present invention relates to a printing apparatus, a power-off control method to be implemented by the printing apparatus, and a recording medium.

Description of the Related Art

The following description sets forth the inventor's knowledge of related art and problems therein and should not be construed as an admission of knowledge in the prior art.

When a printing apparatus is unstable, it can be restored to normal by a well-known technique. In this technique, an administrator user who is responsible for the printing apparatus, for example, can remotely turn off the printing apparatus by transmitting a power-off command for turning off the printing apparatus from an external terminal apparatus. Upon receiving the power-off command, the printing apparatus shuts down or restarts itself.

It is quite ordinary for such a printing apparatus to have one or more jobs in the queue; when this printing apparatus is immediately turned off by a power-off command, it will lose all jobs in the queue.

There has been a printing apparatus to solve this problem. This printing apparatus executes all jobs in the queue upon receiving a power-off command, and then is turned off (see Japanese Patent Application Laid-open Publication No, 2007-320051, for example).

There has been another printing apparatus to solve this problem. This printing apparatus transmits a notice of the presence of jobs in the queue to an external terminal apparatus upon receiving a power-off command. The administrator user can selectively give an instruction for the printing apparatus to be turned off after executing all jobs in the queue or to be turned off after copying all jobs in the queue to an internal or external memory device (see Japanese Patent Application Laid-open Publication No. 2014-094471, for example).

In Japanese Patent Application Laid-open Publication No. 2007-320051, the printing apparatus is turned off after executing all jobs in queue. However, when there are many jobs in the queue under unstable conditions, the printing apparatus can freeze during job execution, making it hardly possible to remotely access the printing apparatus from an external apparatus.

In Japanese Patent Application Laid-open Publication No. 2014-094471, the administrator user can give an instruction for the printing apparatus to be turned off after executing all jobs in the queue. However, when there are many jobs in the queue under unstable conditions, the printing apparatus can freeze during job execution as in the case of Japanese Patent Application Laid-open Publication No. 2007-320051. Alternatively, the administrator user can give an instruction for the printing apparatus to be turned off after copying all jobs in the queue to a memory device. However, when there are many jobs in the queue under unstable conditions, the printing apparatus will execute the many jobs from the memory device after restarting, resulting in a slowdown.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to a printing apparatus including:

a receiver that externally receives a power-off command;

a job execution portion that executes a job;

a burden information obtaining portion that obtains burden information upon receipt of the power-off command by the receiver, the burden information relating to a burden to be imposed on a system of the printing apparatus for executing one or more jobs in a queue stored on the printing apparatus; and a processor that performs either of the following operations depending on the burden information obtained by the burden information obtaining portion: turning off the printing apparatus after making the job execution portion execute at least one, or all of the one or more jobs in the queue; and turning off the printing apparatus without making the job execution portion execute any job in the queue.

A second aspect of the present invention relates to a printing apparatus including:

a receiver that externally receives a power-off command;

a job execution portion that executes a job;

a cost information obtaining portion that obtains cost information upon receipt of the power-off command by the receiver, the cost information relating to costs to be consumed for restoring one or more jobs in a queue stored on the printing apparatus;

an identifying portion that identifies each job in the queue as being whether or not to be executed before power-off of the printing apparatus, with reference to the cost information obtained by the cost information obtaining portion; and a processor that turns off the printing apparatus after making the job execution portion execute only a job identified by the judgment portion as being to be executed before power-off of the printing apparatus.

A third aspect of the present invention relates to a power-off control method to be implemented by a printing apparatus, the power-off control method including:

externally receiving a power-off command;

executing a job;

obtaining burden information upon receipt of the power-off command, the burden information relating to a burden to be imposed on a system of the printing apparatus for executing one or more jobs in a queue stored on the printing apparatus; and performing either of the following operations depending on the burden information obtained: turning off the printing apparatus after executing at least one, or all of the one or more jobs in the queue; and turning off the printing apparatus without executing any job in the queue.

A fourth aspect of the present invention relates to a power-off control method to be implemented by a printing apparatus, the power-off control method including:

externally receiving a power-off command;

executing a job;

obtaining cost information upon receipt of the power-off command, the cost information relating to costs to be consumed for restoring one or more jobs in a queue stored on the printing apparatus;

identifying each job in the queue as being whether or not to be executed before power-off of the printing apparatus, with reference to the cost information obtained; and turning off the printing apparatus after executing only a job identified as being to be executed before power-off of the printing apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
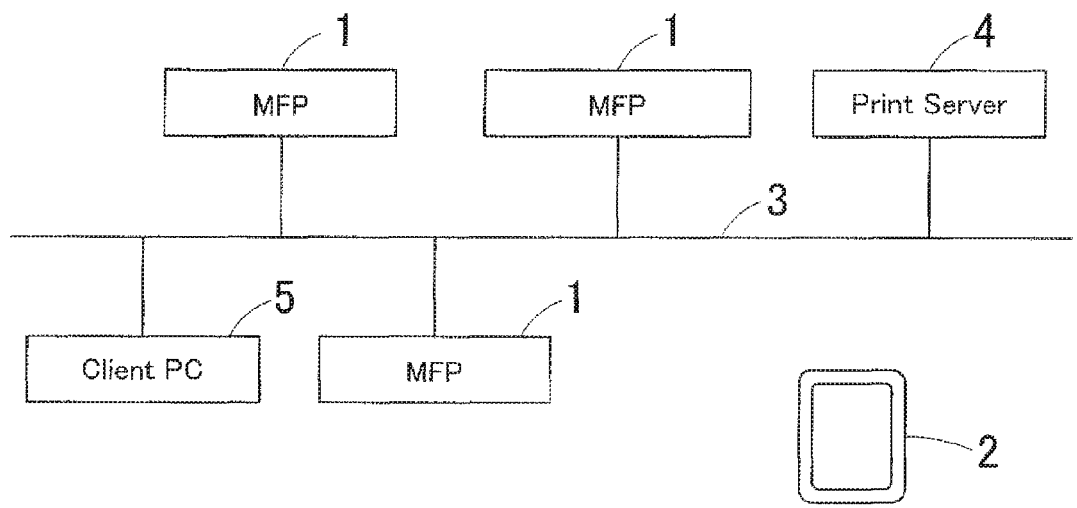
FIG. 1 illustrates a configuration of a printing system provided with a printing apparatus according to one embodiment of the present invention.

FIG. 1 illustrates a configuration of a printing system provided with a printing apparatus according to one embodiment of the present invention. This printing system is provided with a plurality of printing apparatuses 1 (three printing apparatuses in this example), a portable terminal apparatus 2, a print server 4, and one or more terminal apparatuses (to be referred to as "client PCs") 5, all of which are connected to each other through a network 3 such as a local area network (LAN).

In this embodiment, multi-function peripherals (MFPs), i.e., multifunctional digital image forming apparatuses each having various functions such as a copier function, a printer function, a scanner function, and a facsimile function are employed as the printing apparatuses 1. Hereinafter, the printing apparatuses will also be referred to as "MFPs".

Figure 2:
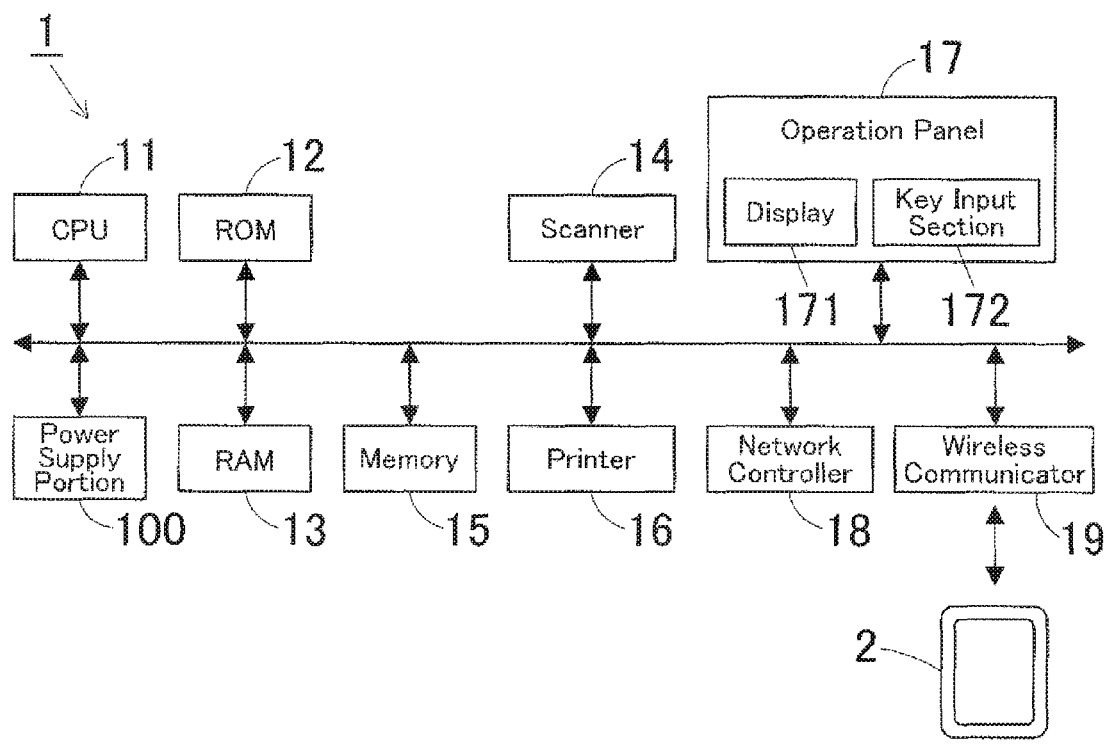
FIG. 2 is a block diagram illustrating a configuration of the printing apparatus.

FIG. 2 is a block diagram illustrating a configuration of the MFP 1. The MFP 1 is essentially provided with a CPU 11, a ROM 12, a RAM 13, a scanner 14, a memory 15, a printer 16, an operation panel 17, a network controller 18, a wireless communicator 19, and a power supply portion 100.

The CPU 11 controls the MFP 1 in a unified and systematic manner such that users can use the basic functions of the MFP 1 such as a copier function, a printer function, a scanner function, and a facsimile function. Furthermore, upon receipt of a power-off command from the portable terminal apparatus 2, the CPU 11 obtains necessary information. The CPU 11 then controls the MFP 1 with reference to the obtained information such that the MFP 1 is turned off after executing jobs waiting in the queue for their turn or is turned off without executing any job in the queue. This will be later described in details.

The ROM 12 is a memory that stores operation programs for the CPU 11 and other data.

The RAM 13 is a memory that provides a work area for the CPU 11 to perform processing in accordance with an operation program.

The scanner 14 is a reading portion that scans a document image to output image data therefrom.

The memory 15 is comprised of a non-volatile memory device such as a hard disk drive (HDD). The memory 15 stores one or more jobs received and waiting in the queue for their turn to start, various applications, and other data. Jobs are erased from the memory 15 after being executed; jobs also disappear from the memory 15 by power-off of the MFP 1.

The printer 16 prints images in a specified print mode on the basis of image data obtained by the scanner 14 from a document, print data externally received, and other data.

The operation panel 17 serves for input for various operations. The operation panel 17 is provided with a display 171 that is comprised of a touch panel liquid-crystal display that displays messages and operation screens, and a key input section 172 having a numeric keypad, a start key, a stop key, and other keys.

The network controller 18 maintains data transmission and receipt by controlling communications with external apparatuses on the network, such as user terminals that are comprised of personal computers.

The wireless communicator 19 establishes communications with the portable terminal apparatus 2 owned by an administrator user responsible for the MFP 1, using a wireless communication technology such as near field communication (NFC). Through the wireless communications, the wireless communicator 19 receives a power-off command and other commands from the portable terminal apparatus 2.

The power supply portion 100 is provided with a switch that starts and shuts off supply of commercial power. The CPU 11 controls the power supply portion 100 such that power supply is started and shut off.

Figure 3:
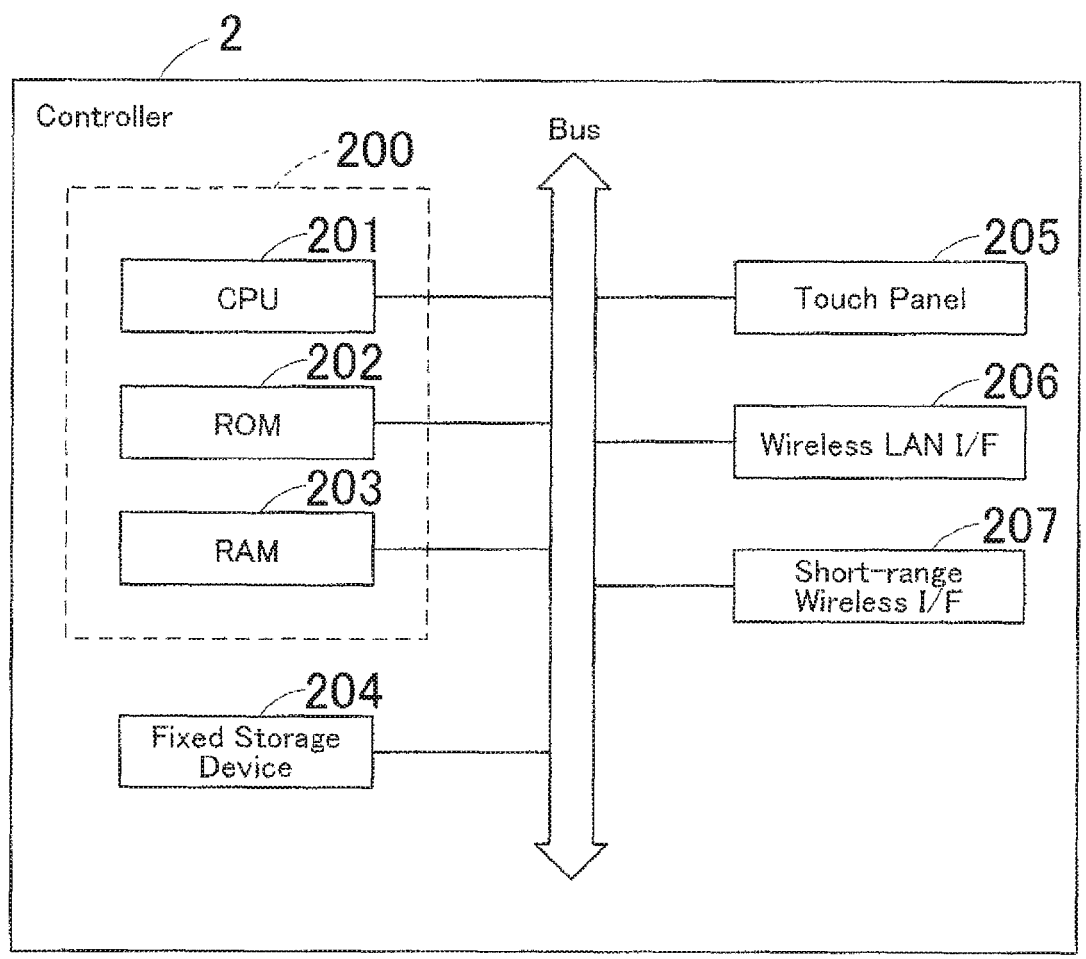
FIG. 3 is a block diagram illustrating a configuration of a portable terminal apparatus.

FIG. 3 is a block diagram illustrating a configuration of the portable terminal apparatus 2. The portable terminal apparatus 2 is comprised of a tablet computer terminal or a cellphone. The portable terminal apparatus 2 is provided with a CPU 201, a ROM 202 that stores control programs, and a RAM 203 that provides a work area for the CPU 201 to perform processing. The ROM 202 and the RAM 203 are connected to the CPU 201 through a bus. The CPU 201, the ROM 202, and the RAM 203 constitute a controller 200 that controls the portable terminal apparatus 2 in a unified and systematic manner.

The following portions are connected to the controller 200 through a bus: a touch panel 205 that displays a variety of information and allows users to dive instructions by touching on the screen, a wireless LAN interface 206, and a short-range wireless interface 207. The wireless LAN interface 206 serves for communications with the network and the MFP 1. The short-range wireless interface 207 is an interface that serves for short-range wireless communication such as BLUETOOTH and infrared communication.

A fixed storage device 204 is further connected to the controller 200 through a bus. The fixed storage device 204 is a hard disk drive, for example, and stores various data objects.

The print server 4 is comprised of a personal computer. The print server 4 stores print jobs received from the client PCs 5 and other external apparatuses, transmits a print job to the user-specified MFP 1, and transmits a print job to the MFP 1 in return to a request.

The client PC 5 is a terminal apparatus owned by a user and is comprised of a personal computer. The client PCs 5 generates a print job to transmit to the user-specified MFP 1 by way of the print server 4 or to the user-specified MFP 1 in a direct manner.

Hereinafter, an operation to be performed by the MFP 1 will be described. In the printing system of FIG. 1, the MFP 1 starts this operation by a power-off command for turning off the MFP 1, which is received from the portable terminal apparatus 2 owned by an administrator user who is responsible for the MFP 1.

When the MFP 1 is unstable, it can be restored to normal by restarting. In order to restore the MFP 1, an administrator user who is responsible for the MFP 1, for example, transmits a power-off command to the MFP 1 from the portable terminal apparatus 2.

In this embodiment, the MFP 1 receives a power-off command from the portable terminal apparatus 2. When there is an active job (print job), the MFP 1 obtains burden information of the MFP 1 itself after completing the active job. Here, the burden information is information about a burden to be imposed on the system of the MFP 1 for executing all one or more jobs in the queue (print jobs in the queue) stored on the MFP 1. The burden information serves to judge whether or not a burden for executing all jobs in the queue will be too heavy for the system. The burden information may indicate the size of free space in the RAM 13, the number of jobs in the queue, or the total size of jobs in the queue, for example, which is specified in advance.

Figure 4:
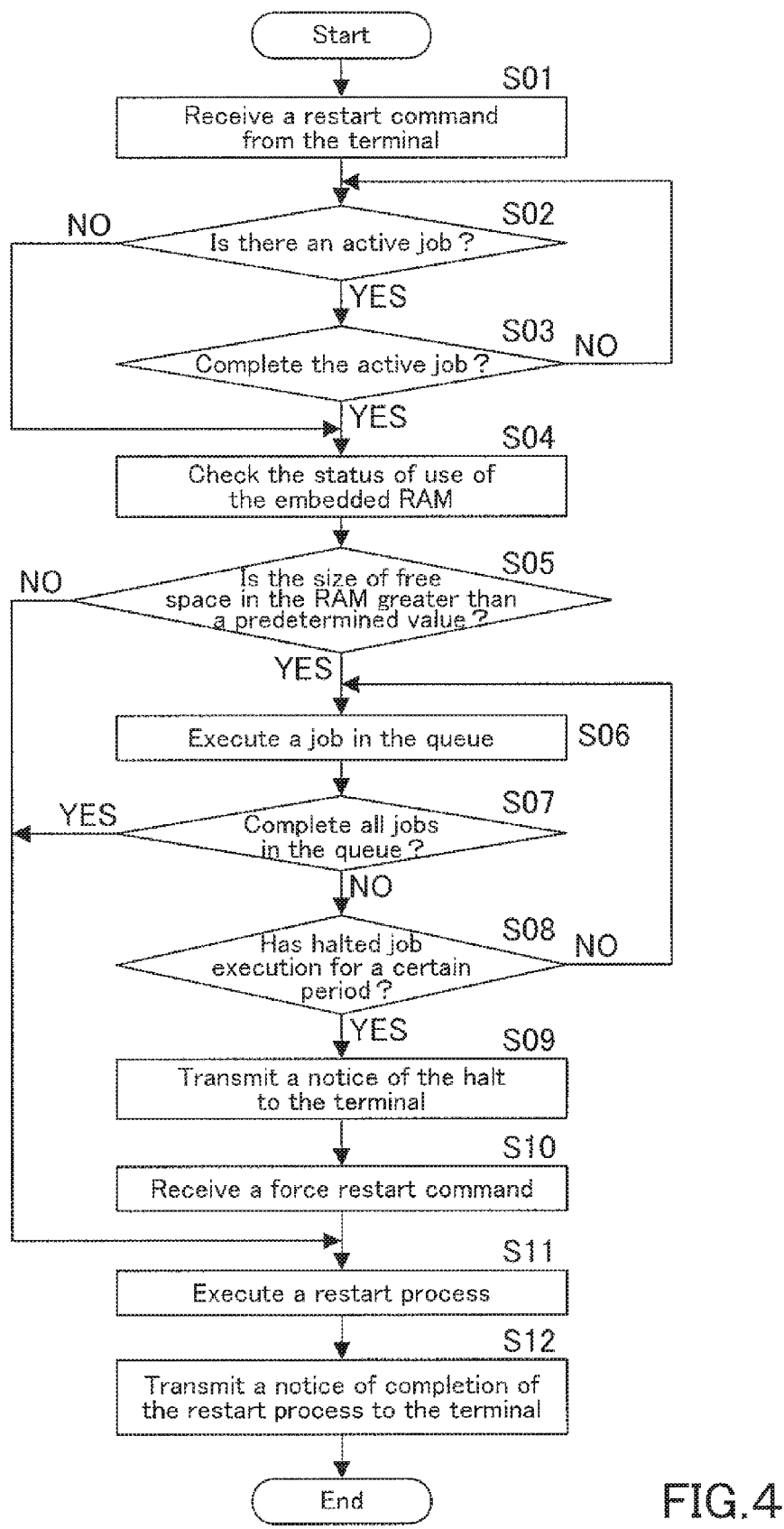
FIG. 4 is a flowchart representing the operation for the printing apparatus to start by a power-off command received from the portable terminal apparatus when the burden information indicates the size of free space in the RAM.

FIG. 4 is a flowchart representing the operation for the MFP 1 to start by a power-off command received from the portable terminal apparatus 2 when the burden information indicates the size of free space in the RAM 13.

The routines represented by the FIG. 4 flowchart and the following flowcharts are executed by the CPU 11 of the MFP 1 in accordance with operation programs stored on a recording medium such as the ROM 12. In this configuration, the MFP 1 receives a restart command for restarting the MFP 1 as a power-off command. Alternatively, the MFP 1 may receive a shutdown command for shutting down the MFP 1 as a power-off command such that the user manually restarts the MFP 1.

In Step S01, the MFP 1 receives a restart command from the portable terminal apparatus (hereinafter, also to be referred to as "terminal" for short) 2. In Step S02, it is judged whether or not there is an active job. If there is an active job (YES in Step S02), the routine then waits in Step S03 until the active job is completed (NO in Step S03). If the active job is completed (YES in Step S03), the routine proceeds to Step S04. Back to Step S02, if there is no active job (NO in Step S02), the routine proceeds to Step S04 in a direct manner.

In Step S04, the status of use of the embedded RAM 13 is checked, and the size of free space in the RAM 13 is obtained. In Step S05, it is judged whether or not the size of free space in the RAM 13 is greater than a predetermined value. Normally, relevant data about a job, such as commands, parameters, and programs, is erased from the RAM 13 after the job is executed, but it can partially remain in the RAM 13 for some reason. In this case, the size of free space in the RAM 13 is small.

If the size of free space in the RAM 13 is equal or less than a predetermined value (NO in Step S05), this means, a burden for executing all jobs in the queue will be too heavy for the system and thus the MFP 1 is likely to freeze during job execution. So, the routine proceeds to Step S11 to execute a restart process. In Step S12, a notice of completion of the restart process is transmitted to the terminal 2. The MFP 1 is immediately turned off without executing any job in the queue in the above-described manner, and all jobs in the queue disappear from the queue.

Back to Step S05, if the size of free memory in the RAM 13 is greater than a predetermined value (YES in Step S05), this means, a burden for executing all one or more jobs in the queue will not be too heavy for the system and thus the MFP 1 is hardly likely to freeze during job execution. So, the MFP 1 executes all jobs waiting in the queue for their turn to start.

In other words, all jobs in the queue are executed in Step S06, and it is then judged in Step S07 whether or not all jobs in the queue are completed. If all jobs in the queue are not completed (NO in Step S07), it is then judged in Step S08 whether or not job execution has been halted for a certain period. The MFP 1 may make this judgment depending on whether or not to receive a periodic check signal from the terminal 2 or depending on the result of a self-check without a check signal from the terminal 2. If job execution is ongoing (NO in Step S08), the routine returns to Step S06 then repeats Steps S06 to S07 until all jobs in the queue are completed. If all jobs in the queue are completed (YES in Step S07), the routine proceeds to Step S11 to execute a restart process. In Step S12, a notice of completion of the restart process is transmitted to the terminal 2. The MFP 1 regains normality and stability by the restart process.

Back to Step S08, if job execution has been halted far a certain period (YES in Step S08), a notice of the halt is transmitted to the terminal 2 in Step S09. In response to this notice, the terminal 2 returns to the MFP 1 a force restart command for forcing the MFP 1 to restart immediately. The MFP 1 receives this force restart command in Step S10, and the routine proceeds to Step S11 to execute a restart process. In Step S12, a notice of completion of the restart process is transmitted to the terminal 2. In this case, unexecuted jobs in the queue disappear from the queue.

As described above, in this embodiment, if the size of free space in the RAM 13 is greater than a predetermined value, the MFP 1 is turned off after executing all jobs in the queue; if it is equal to or less than a predetermined value, the MFP 1 is immediately turned off. In other words, when a burden for executing all jobs in the queue is too heavy for the system and thus the MFP 1 is likely to freeze during job execution, the MFP 1 is turned off without executing any job in the queue. Thus the MFP 1 can decrease the risk of freezing which the MFP 1 would take when the MFP 1 has to be turned off after executing all jobs in the queue. When a burden for executing all jobs in the queue is not too heavy for the system and thus the MFP 1 is hardly likely to freeze during job execution, the MFP 1 is turned off after executing all jobs in the queue. Thus the MFP 1 can decrease the risk of a slowdown which the MFP 1 would take when the MFP 1 has to restart itself to execute all jobs in the queue, after copying them to a recording medium.

As described above, in the embodiment of the FIG. 4 flowchart, if the size of free space in the RAM 13 is greater than a predetermined value, the MFP 1 is turned off after executing all jobs in the queue. Alternatively, in this situation, the MFP 1 may be turned off after executing only jobs whose size are less than a predetermined value, for example.

Furthermore, in this embodiment, the MFP 1 receives a restart command when there is a job in the queue. In another configuration, it may be further judged whether or not there is a job in the queue right before Step S04. If there is no job, a restart process is executed in Step S11; if there is a job, the size of free space in the RAM 13 is obtained in Step S04.

Figure 5:
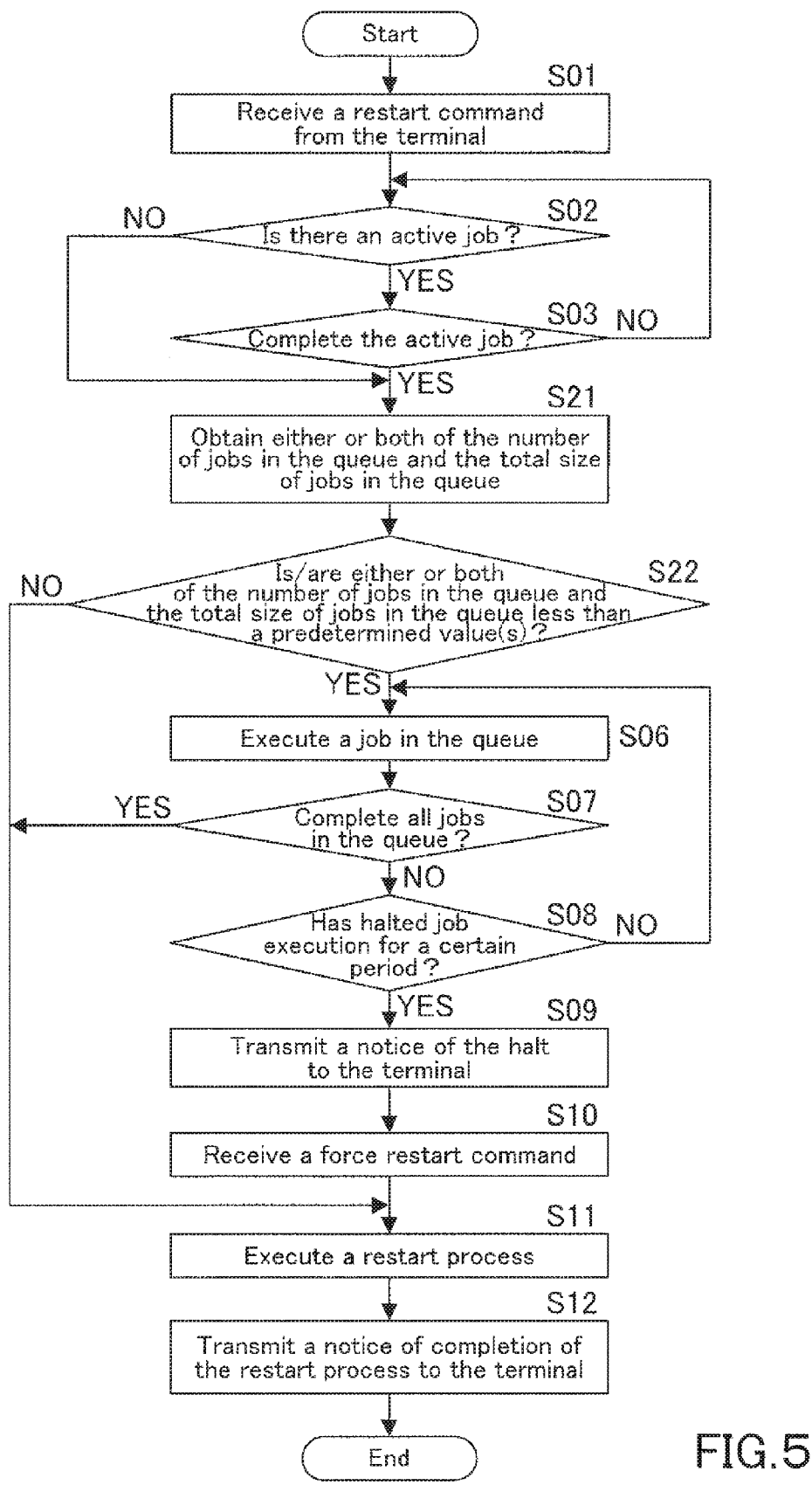
FIG. 5 is a flowchart representing the operation for the printing apparatus to start by a power-off command received from the portable terminal apparatus when the burden information indicates either or both of the number of jobs in the queue and the total size of jobs in the queue.

FIG. 5 relates to another embodiment of the present invention. FIG. 5 is a flowchart representing the operation for the MFP 1 to start by a power-off command received from the portable terminal apparatus 2 when the burden information indicates either or both of the number of jobs in the queue and the total size of jobs in the queue.

Hereinafter, a detailed description of the processes in Steps S01 to S03 and Step S06 to S12 in FIG. 5 flowchart will be omitted because these processes are identical with the above-described processes in Step S01 to S03 and Steps S06 to S12 in FIG. 4 flowchart.

In Step S03 of FIG. 5, if the active jobs is completed (YES in Step S03), the routine proceeds to Step S21. In Step S02, if there is no active job (NO in Step S02), the routine proceeds to Step S21 in a direct manner.

In Step S21, either or both of the number of jobs in the queue and the total size of jobs in the queue is/are obtained. It is judged in Step S22 whether or not either or both of the obtained number and size is/are less than a predetermined value(s). If either or both of the obtained number and size is/are not less than a predetermined value(s), i.e., is/are equal to or greater than a predetermined value(s) (NO in Step S22), this means, a burden for executing all jobs in the queue will be too heavy for the system and thus the MFP 1 is likely to freeze during job execution. So, the routine proceeds to Step S11 to execute a restart process. The MFP 1 is immediately turned off without executing any job in the queue in the above-described manner, and all jobs in the queue will disappear from the queue. The burden is judged depending on one of the following options which is specified in advance: the number of jobs in the queue, the total size of jobs in the queue, and both of the number of jobs in the queue and the total size of jobs in the queue.

In Step S22, if either or both of the number of jobs in the queue and the total size of jobs in the queue is/are less than a predetermined value(s) (YES in Step S22), this means, a burden for executing all one or more jobs in the queue will not be too heavy for the system and thus the MFP 1 is hardly likely to freeze during job execution. So, the routine proceeds to Step S06 to execute all jobs waiting in the queue for their turn to start.

As described above, in this embodiment, if either or both of the number of jobs in the queue and the total size of jobs in the queue is/are less than a predetermined value(s), the MFP 1 is turned off after executing all jobs in the queue; if it is/are equal to or greater than a predetermined value(s), the MFP 1 is immediately turned off. In other words, when a burden for executing all jobs in the queue is too heavy for the system and thus the MFP 1 is likely to freeze during job execution, the MFP 1 is turned off without executing any job in the queue. Thus the MFP 1 can decrease the risk of freezing which the MFP 1 would take when the MFP 1 has to be turned off after executing all jobs in the queue. When a burden for executing all jobs in the queue is not too heavy for the system and thus the MFP 1 is hardly likely to freeze during job execution, the MFP 1 is turned off after executing all jobs in the queue. Thus the MFP 1 can decrease the risk of a slowdown which the MFP 1 would take when the MFP 1 has to restart itself to execute all jobs in the queue, after copying them to a recording medium.

As described above, in the embodiment of the FIG. 5 flowchart, if either or both of the number of jobs in the queue and the total size of jabs in the queue is/are less than a predetermined value(s), the MFP 1 is turned off after executing all jobs in the queue. Alternatively, in this situation, the MFP 1 may be turned off after executing at least one of the jobs in the queue, for example, only jobs whose sizes are less than a predetermined value.

Furthermore, in this embodiment, the MFP 1 receives a restart command when there is a job in the queue. In another configuration, it may be further judged whether or not there is a job in the queue right before Step S21. If there is no job, a restart process is executed in Step S11; if there is a job, either or both of the number of jobs in the queue or the total size of jobs in the queue is/are obtained in Step S21.

Furthermore, in this embodiment, the MFP 1 is turned off after executing all jobs in the queue or is immediately turned off without executing any jobs in the queue depending on the judgment whether or not either or both of the number of jobs in the queue and the total size of jobs in the queue is/are less than a predetermined value(s). Alternatively, the MFP 1 may be turned off after executing all jobs in the queue or is immediately turned off without executing any job in the queue depending on the combination of the following judgments: whether or not either or both of the number of jobs in the queue and the total size of jobs in the queue is/are less than a predetermined value(s); and whether or not the size of free space in the RAM 13 is greater than a predetermined value.

Figure 6:
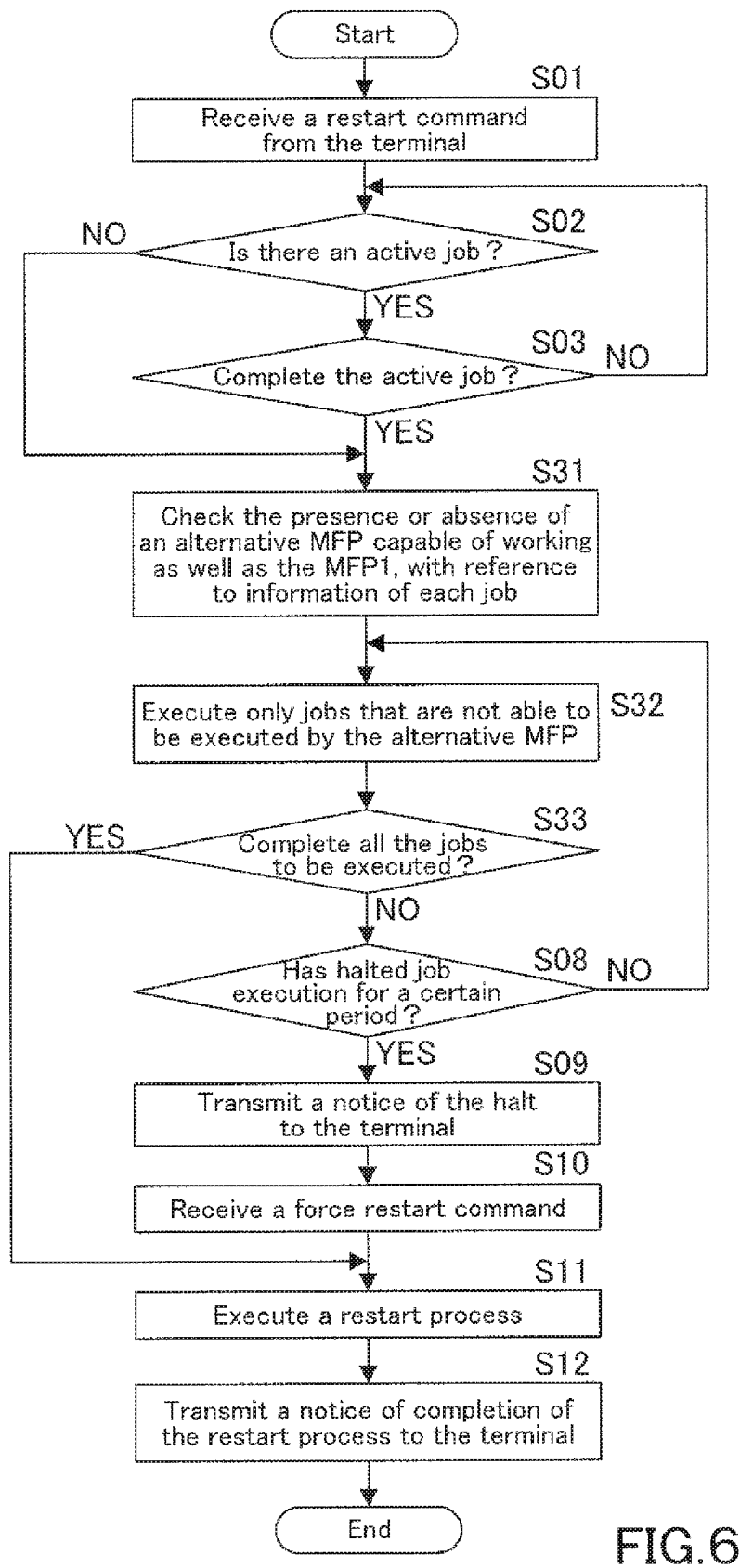
FIG. 6 is a flowchart representing the operation for the printing apparatus to start by a power-off command when the cost information relates to the presence or absence of an alternative printing apparatus capable of working as well as the printing apparatus, which is on the same network as the printing apparatus in a predetermined area.
Figure 7:
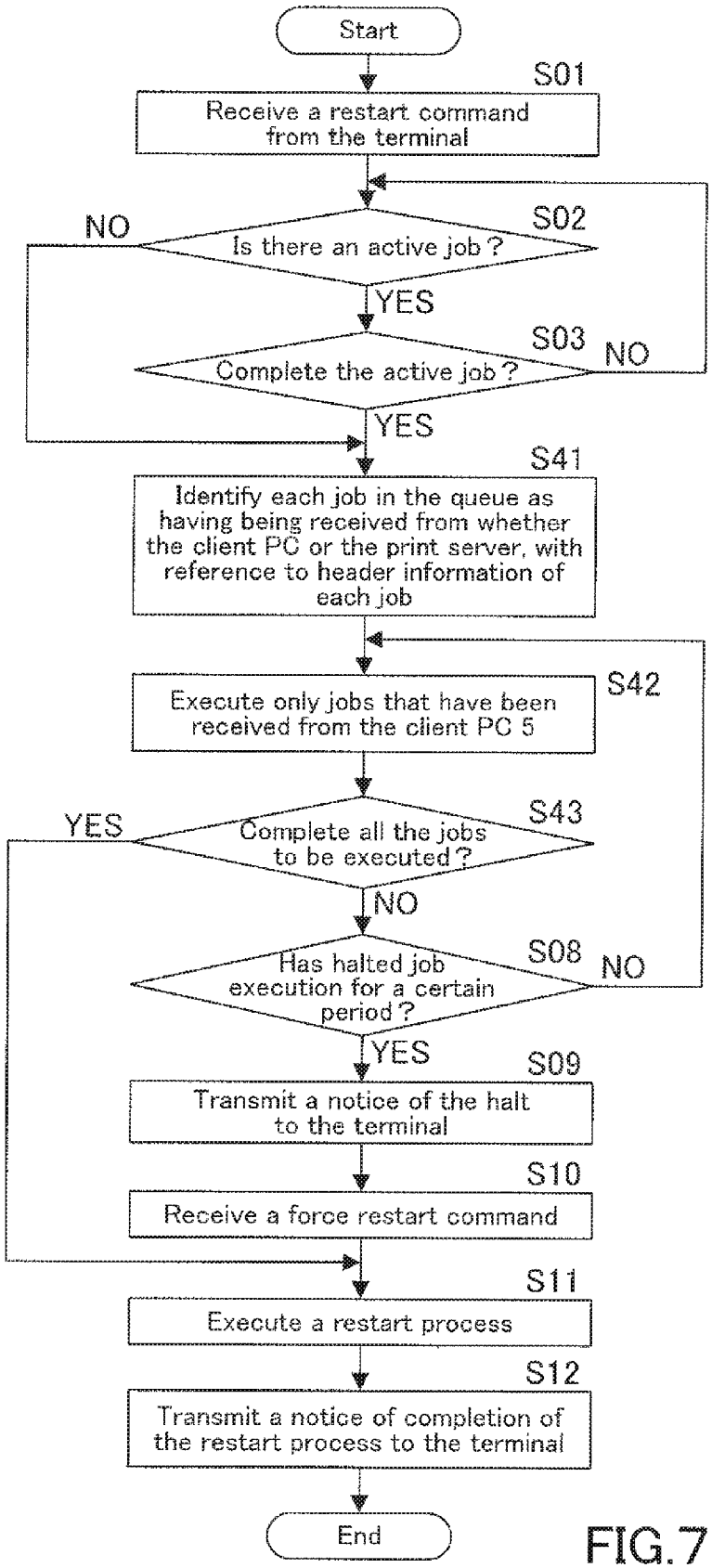
FIG. 7 is a flowchart representing the operation for the printing apparatus to start by a power-off command when the cost information relates to senders of jobs in the queue.

FIGS. 6 and 7 are flowcharts to be referred to explain yet other embodiments of the present invention. In these embodiments, upon receiving a power-off command, the MFP 1 obtains cost information about costs to be consumed for restoring jobs in the queue. The MFP 1 then identifies jobs in queue which will consume a high restoring cost with reference to the cost information. By being turned off after executing only jobs in the queue which will consume a high restoring cost, the MFP 1 can decrease the risk of freezing which the MFP 1 would take when the MFP 1 has to be turned off after executing all jobs in the queue. By being turned off after executing only jobs in the queue which will consume a high restoring cost, the MFP 1 can further decrease the risk of a slowdown which the MFP 1 would take when the MFP 1 has to restart itself to execute all jobs in the queue, after copying them to a recording medium.

The cost information includes all extra costs to be consumed for restoring jobs in the queue, such as the number of users to be secured, required time, and a budget amount, and such extra costs are specified in advance. The cost information further includes the information whether such extra costs are high or low.

FIG. 6 is a flowchart representing the operation for the MFP 1 to start by a power-off command when the cost information relates to the presence or absence of an alternative MFP capable of working as well as the MFP 1, which is on the same network as the MFP 1 in a predetermined area.

When an alternative MFP capable of working as well as the MFP 1 is present on the same network as the MFP 1 in a predetermined area, the user would have his/her prints earlier using this alternative MFP, and the total costs would be low.

In this embodiment, when a job can be executed by an alternative MFP capable of working as well as the MFP 1, which is on the same network as the MFP 1 in a predetermined area, the MFP 1 does not execute the job. The MFP 1 executes only jobs that cannot be executed by the alternative MFP.

Hereinafter, a detailed description of the processes in Steps S01 to S03 and Step S08 to S12 in FIG. 6 flowchart will be omitted because these processes are identical with the above-described processes in Step S01 to S03 and Steps S08 to S12 in FIG. 4 flowchart.

In Step S03 of FIG. 6, if the active jobs is completed (YES in Step S03), the routine proceeds to Step S31. In Step S02, if there is no active job (NO in Step S02), the routine proceeds to Step S31 in a direct manner.

In Step S31, with reference to information of each job, the presence or absence of an alternative MFP capable of working as well as the MFP 1 is checked, which is on the same network as the MFP 1 in a predetermined area. The predetermined area is a room in which the MFP 1 is located, for example. The MFP 1 may store registered information about locations of the other MFPs (location information), whether or not they are on the same network as the MFP 1, and printer performances for judging whether or not they are capable of working as well. Alternatively, the MFP 1 may transmit an inquiry to a management server (not shown in this figure) that stores this registered information and manages all MFPs on the network in a unified manner. Yet alternatively, the MFP 1 may transmit an inquiry to the other MFPs through the network.

In Step S32, only jobs that are identified as not being to be executed by the alternative MFP because of the absence of the alternative MFP are executed in order. In Step S33, it is judged whether or not all the jobs to be executed are completed. If all the jobs to be executed are not completed (NO in Step S33), it is then judged in Step S08 whether or not job execution has been halted for a certain period. If job execution is ongoing (NO in Step S08), the routine returns to repeat Steps S32 to S08 until all the jobs to be executed are completed.

If all the jobs to be executed are completed (YES in Step S33), the routine proceeds to Step S11 to execute a restart process.

As described above, in this embodiment, upon receiving a power-off command from the terminal 2, the MFP 1 obtains information relates to the presence or absence of an alternative MFP capable of working as well as the MFP 1, which is on the same network as the MFP 1 in a predetermined area. When the alternative MFP is present, a job can be executed by the alternative MFP. This means that the alternative MFP has no difficulty in executing the job and an extra cost is not required in order to do it. So, the MFP 1 does not execute the job. When the alternative MFP is absent, a job cannot be executed by the alternative MFP. This means that the alternative MFP has difficulty in executing the job and an extra cost would be required in order to do it. So, the MFP 1 is turned off after executing only the job.

In other words, by being turned off after executing only jobs in the queue which will consume a high restoring cost, the MFP 1 can decrease the risk of freezing which the MFP 1 would take when the MFP 1 has to be turned off after executing all jobs in the queue. By being turned off after executing only jobs in the queue which will consume a high restoring cost, the MFP 1 can further decrease the risk of a slowdown which the MFP 1 would take when the MFP 1 has to restart itself to execute all jobs in the queue, after copying them to a recording medium.

FIG. 7 is a flowchart representing the operation for the MFP 1 to start by a power-off command when the cost information relates to senders of jobs in the queue.

When a sender of a job in the queue is the print server 4, this means that the print server 4 has no difficulty in transferring the job again after restarting of the MFP 1 and an extra cost is not required in order to do it. When a sender of a job in the queue is the client PC 5, this means that the user has to manually transfer the job again and an extra cost would be required in order to do it. By being turned off after executing only jobs in the queue whose senders are the client PC 5, the MFP 1 can decrease the risk of freezing and a slowdown.

Hereinafter, a detailed description of the processes in Steps S01 to S03 and Step S08 to S12 in FIG. 7 flowchart will be omitted because these processes are identical with the above-described processes in Step S01 to S03 and Steps S08 to S12 in FIG. 4 flowchart.

In Step S03 of FIG. 7, if the active jobs is completed (YES in Step S03), the routine proceeds to Step S41. In Step S02, if there is no active job (NO in Step S02), the routine proceeds to Step S41 in a direct manner.

In Step S41, each job in the queue is identified as having being received from the client PC 5 or the print server 4. This identification is conducted with reference to header information of each job, for example. Jobs having been received from the print server 4 contain information of the print server 4 (an IP address of the print server 4, for example) in their header information. Meanwhile, the MFP 1 stores an IP address of the print server 4. Jobs containing an IP address of the print server 4 in their header information are identified as having been received from the print server 4. Jobs not containing an IP address of the print server 4 in their header information are identified as having been received from the client PC 5.

In Step S42, only jobs having been received from the client PC 5 are executed in order. In Step S43, it is judged whether or not all the jobs to be executed are completed. If all the jobs to be executed are not completed (NO in Step S43), it is then judged in Step S08 whether or not job execution has been halted for a certain period. If job execution is ongoing (NO in Step S08), the routine returns to repeat Steps S42 to S08 until all the jobs to be executed are completed.

If all the jobs to be executed are completed (YES in Step S43), the routine proceeds to Step S11 to execute a restart process.

In this embodiment of FIG. 7, the MFP 1 executes only jobs in the queue which have been received from the client PC 5. Alternatively, the MFP 1 may also execute jobs in the queue which have been received from an external apparatus other than the print server 4 or the client PC 5, as well as jobs in the queue which have been received from the client PC 5.

As described above, in the embodiment of FIG. 6, the MFP 1 obtains information relating to the presence or absence of an alternative MFP capable of working as well as the MFP 1, which is on the same network as the MFP 1 in a predetermined area, and uses this information in its judgment. In the embodiment of FIG. 7, the MFP 1 obtains information about senders of jobs in the queue and uses this information in its judgment. In these embodiments, the MFP 1 may use a combination of these types of information in its judgment. In other words, the MFP 1 may be turned off after executing only jobs in the queue whose senders are the client PC 5 and which cannot be executed by an alternative MFP capable of working as well as the MFP 1, which is on the same network as the MFP 1 in a predetermined area.

In the embodiments of FIGS. 4 to 7, jobs in the queue can result in being unexecuted and only waiting for power-off. The MFP 1 may transmit by e-mail or other means a message warning that the unexecuted jobs will disappear from the queue by power-off of the MFP 1, to senders of the unexecuted jobs.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A printing apparatus comprising:
a receiver that externally receives a power-off command;
a job execution portion that executes a job;
a burden information obtaining portion that obtains burden information upon receipt of the power-off command by the receiver, the burden information relating to a burden to be imposed on a system of the printing apparatus for executing one or more jobs in a queue stored on the printing apparatus; and
a processor that performs either of the following operations depending on the burden information obtained by the burden information obtaining portion: turning off the printing apparatus after making the job execution portion execute at least one, or all of the one or more jobs in the queue; and turning off the printing apparatus without making the job execution portion execute any job in the queue.

2. A printing apparatus according to claim 1, wherein:
the burden information indicates a size of free space in a RAM loaded on the printing apparatus; and
the processor turns off the printing apparatus after making the job execution portion execute at least one, or all of the one or more jobs in the queue if the size of free space in the RAM is greater than a predetermined value; or the processor turns off the printing apparatus without making the job execution portion execute any job in the queue if the size of free space in the RAM is equal to or less than the predetermined value.

3. The printing apparatus according to claim 1, wherein:
the burden information indicates a number of jobs in the queue; and
the processor turns off the printing apparatus after making the job execution portion execute at least one, or all of the one or more jobs in the queue if the number of jobs in the queue is less than a predetermined value; or the processor turns off the printing apparatus without making the job execution portion execute any job in the queue if the number of jobs in the queue is equal to or greater than the predetermined value.

4. The printing apparatus according to claim 1, wherein:
the burden information indicates a total size of jobs in the queue; and
the processor turns off the printing apparatus after making the job execution portion execute at least one, or all of the one or more jobs in the queue if the total size of jobs in the queue is less than a predetermined value; or the processor turns off the printing apparatus without making the job execution portion execute any job in the queue if the total size of jobs in the queue is equal to or greater than the predetermined value.

5. A printing apparatus comprising:
a receiver that externally receives a power-off command;
a job execution portion that executes a job;
a cost information obtaining portion that obtains cost information upon receipt of the power-off command by the receiver, the cost information relating to costs to be consumed for restoring one or more jobs in a queue stored on the printing apparatus;
an identifying portion that identifies each job in the queue as being whether or not to be executed before power-off of the printing apparatus, with reference to the cost information obtained by the cost information obtaining portion; and a processor that turns off the printing apparatus after making the job execution portion execute only a job identified by the identifying portion as being to be executed before power-off of the printing apparatus.

6. The printing apparatus according to claim 5, wherein:

the cost information obtained by the cost information obtaining portion relates to a presence or absence of an alternative printing apparatus capable of working as well as the printing apparatus, the alternative printing apparatus being on a same network as the printing apparatus in a predetermined area; and when the alternative printing apparatus is absent, the identifying portion identifies a job, which cannot be executed by the alternative printing apparatus, as being to be executed before power-off of the printing apparatus.

7. The printing apparatus according to claim 5, wherein:

the cost information obtained by the cost information obtaining portion relates to a sender of each job in the queue; and when a sender of a job is an external apparatus other than a print server, the identifying portion identifies the job as being to be executed before power-off of the printing apparatus.

8. A power-off control method to be implemented by a printing apparatus, the power-off control method comprising:

externally receiving a power-off command;

executing a job;

obtaining burden information upon receipt of the power-off command, the burden information relating to a burden to be imposed on a system of the printing apparatus for executing one or more jobs in a queue stored on the printing apparatus; and performing either of the following operations depending on the burden information obtained: turning off the printing apparatus after executing at least one, or all of the one or more jobs in the queue; and turning off the printing apparatus without executing any job in the queue.

9. A power-off control method to be implemented by a printing apparatus, the power-off control method comprising:

externally receiving a power-off command;

executing a job;

obtaining cost information upon receipt of the power-off command, the cost information relating to costs to be consumed for restoring one or more jobs in a queue stored on the printing apparatus;

identifying each job in the queue as being whether or not to be executed before power-off of the printing apparatus, with reference to the cost information obtained; and turning off the printing apparatus after executing only a job identified as being to be executed before power-off of the printing apparatus.

10. A non-transitory computer-readable recording medium storing a program to make a computer of the printing apparatus execute the power-off control method according to claim 8.

11. A non-transitory computer-readable recording medium storing a program to make a computer of the printing apparatus execute the power-off control method according to claim 9.

\* \* \* \* \*